United States Patent
Hara et al.

(10) Patent No.: US 8,374,460 B2
(45) Date of Patent: Feb. 12, 2013

(54) IMAGE PROCESSING UNIT, NOISE REDUCTION METHOD, PROGRAM AND STORAGE MEDIUM

(75) Inventors: Takayuki Hara, Kanagawa (JP); Haike Guan, Kanagawa (JP); Satoshi Hikida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 829 days.

(21) Appl. No.: 12/458,963

(22) Filed: Jul. 28, 2009

(65) Prior Publication Data

US 2010/0027906 A1 Feb. 4, 2010

(30) Foreign Application Priority Data

Jul. 29, 2008 (JP) ................................. 2008-195385
Jan. 29, 2009 (JP) ................................. 2009-018377

(51) Int. Cl.
G06K 9/40 (2006.01)
H04N 9/74 (2006.01)
(52) U.S. Cl. ................... 382/275; 382/264; 348/597
(58) Field of Classification Search .................. None
See application file for complete search history.

(56) References Cited

U.S. PATENT DOCUMENTS

| | | | |
|---|---|---|---|
| 5,351,314 A | 9/1994 | Vaezi | |
| 2004/0136604 A1* | 7/2004 | Kuwata et al. | 382/254 |
| 2005/0151990 A1 | 7/2005 | Ishikawa et al. | |
| 2007/0086674 A1 | 4/2007 | Guan | |
| 2007/0172146 A1 | 7/2007 | Guan | |
| 2007/0223815 A1* | 9/2007 | Makram-Ebeid | 382/173 |
| 2008/0027994 A1 | 1/2008 | Guan | |
| 2008/0118173 A1* | 5/2008 | Maurer | 382/260 |
| 2009/0052756 A1* | 2/2009 | Saddi et al. | 382/131 |
| 2010/0208946 A1* | 8/2010 | Hayaishi | 382/108 |

FOREIGN PATENT DOCUMENTS

| | | |
|---|---|---|
| JP | 2790604 | 6/1988 |
| JP | 3309941 | 5/2002 |
| JP | 4069581 | 6/2002 |
| JP | 2003-061105 | 2/2003 |
| JP | 2003-219180 | 7/2003 |
| JP | 2003-274180 | 9/2003 |
| JP | 2004-282511 | 10/2004 |
| JP | 2004-336652 | 11/2004 |
| JP | 2005-117119 | 4/2005 |
| JP | 2005-117449 | 4/2005 |

(Continued)

OTHER PUBLICATIONS

An English language abstract of Japanese Publication No. JP 7-152908, published Jun. 16, 1995.

(Continued)

*Primary Examiner* — Randolph I Chu
(74) *Attorney, Agent, or Firm* — Harness, Dickey & Pierce, P.L.C.

(57) ABSTRACT

An image processing unit is disclosed that smoothens a notice pixel of input image data with pixel values of pixels around the notice pixel to reduce noise in the image data. The image processing unit includes an edge extraction unit that extracts an edge based on the pixel values of the image data; a region determination unit that determines a region to be processed where a sum of edge intensities of the pixels including the notice pixel becomes greater than or equal to a threshold; and a smoothening unit that changes a smoothening intensity in accordance with a size of the region to be processed to smoothen the notice pixel corresponding to the region to be processed.

12 Claims, 14 Drawing Sheets

FOREIGN PATENT DOCUMENTS

| JP | 2005-142891 | 6/2005 |
|---|---|---|
| JP | 2005-160544 | 6/2005 |
| JP | 2007-306501 | 11/2007 |
| JP | 4042563 | 11/2007 |
| JP | 2008-035547 | 2/2008 |
| JP | 2008-059406 | 3/2008 |
| JP | 2008-061217 | 3/2008 |
| JP | 4104475 | 4/2008 |
| WO | WO 02/05544 | 1/2002 |
| WO | WO 2006/040960 | 4/2006 |

OTHER PUBLICATIONS

An English language abstract of Japanese Publication No. JP 8-163408, published Jun. 21, 1996.

An English language abstract of Japanese Publication No. JP 2004-214756, published Jul. 29, 2004.

An English language abstract of Japanese Publication No. JP 2002-185795, published Jun. 28, 2002.

An English language abstract of Japanese Publication No. JP 2004-282593, published Oct. 7, 2004.

Huang Jiwu. "Adaptive filtering of block effects based on edge map." Signal Processing, $3^{rd}$ International Conference on Beijing, China, vol. 1, Oct. 14-18, 1996, pp. 583-586.

Ardeshi Goshtasby et al. "An adaptive window mechanism for image smoothing." Computer Vision and Image Understanding, Academic Press, US, vol. 111, No. 2, Oct. 9, 2007, pp. 155-169.

G. Deng et al. "An adaptive Gaussian filter for noise reduction and edge detection." Nuclear Science Symposium and Medical Imaging Conference, San Francisco, Oct. 31, 1993, pp. 1615-1619.

European Search Report for Corresponding European Application dated Oct. 13, 2009.

* cited by examiner

FIG.6A

| -1 | -1 | -1 |
|----|----|----|
| 0  | 0  | 0  |
| 1  | 1  | 1  |

| -1 | 0 | 1 |
|----|---|---|
| -1 | 0 | 1 |
| -1 | 0 | 1 |

FIG.6B

| -1 | -2 | -1 |
|----|----|----|
| 0  | 0  | 0  |
| 1  | 2  | 1  |

| -1 | 0 | 1 |
|----|---|---|
| -2 | 0 | 2 |
| -1 | 0 | 1 |

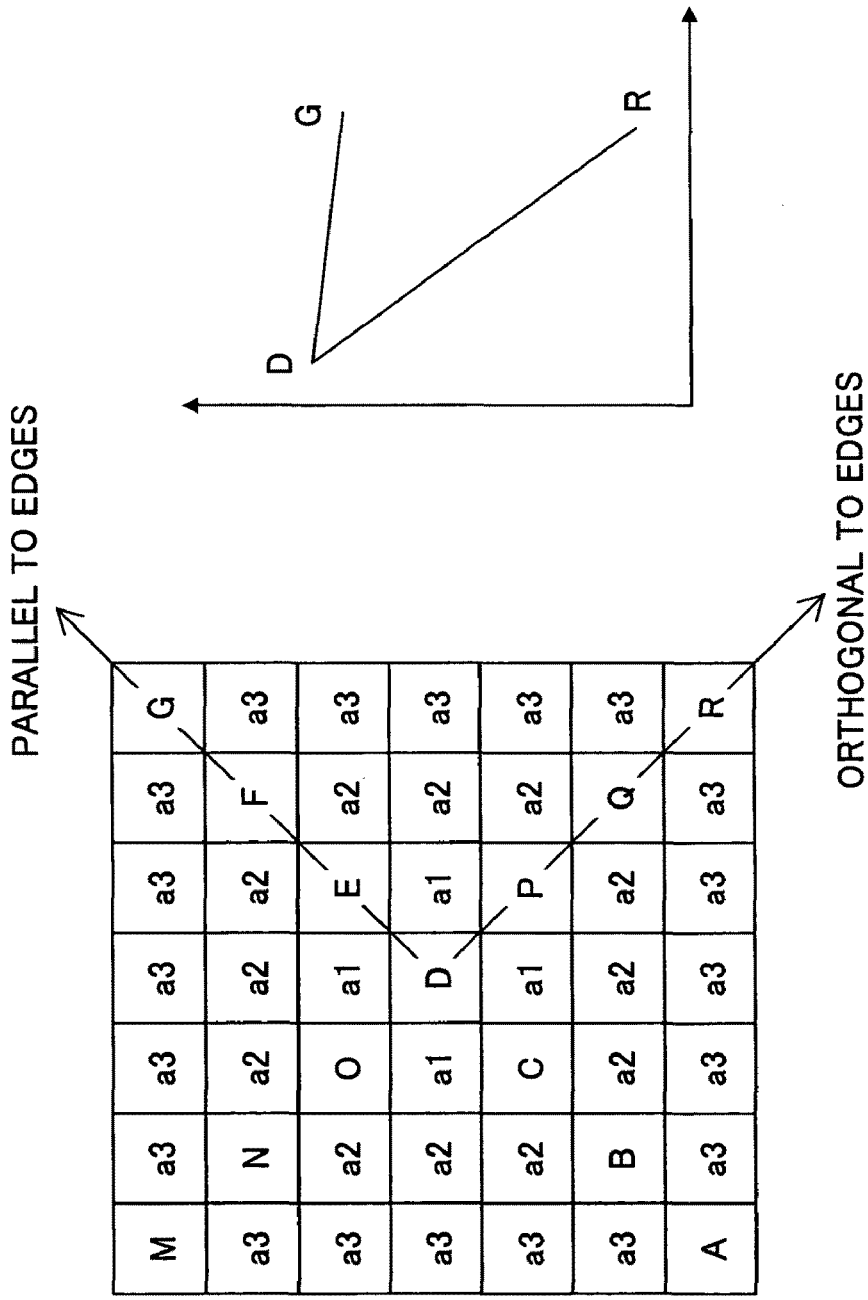

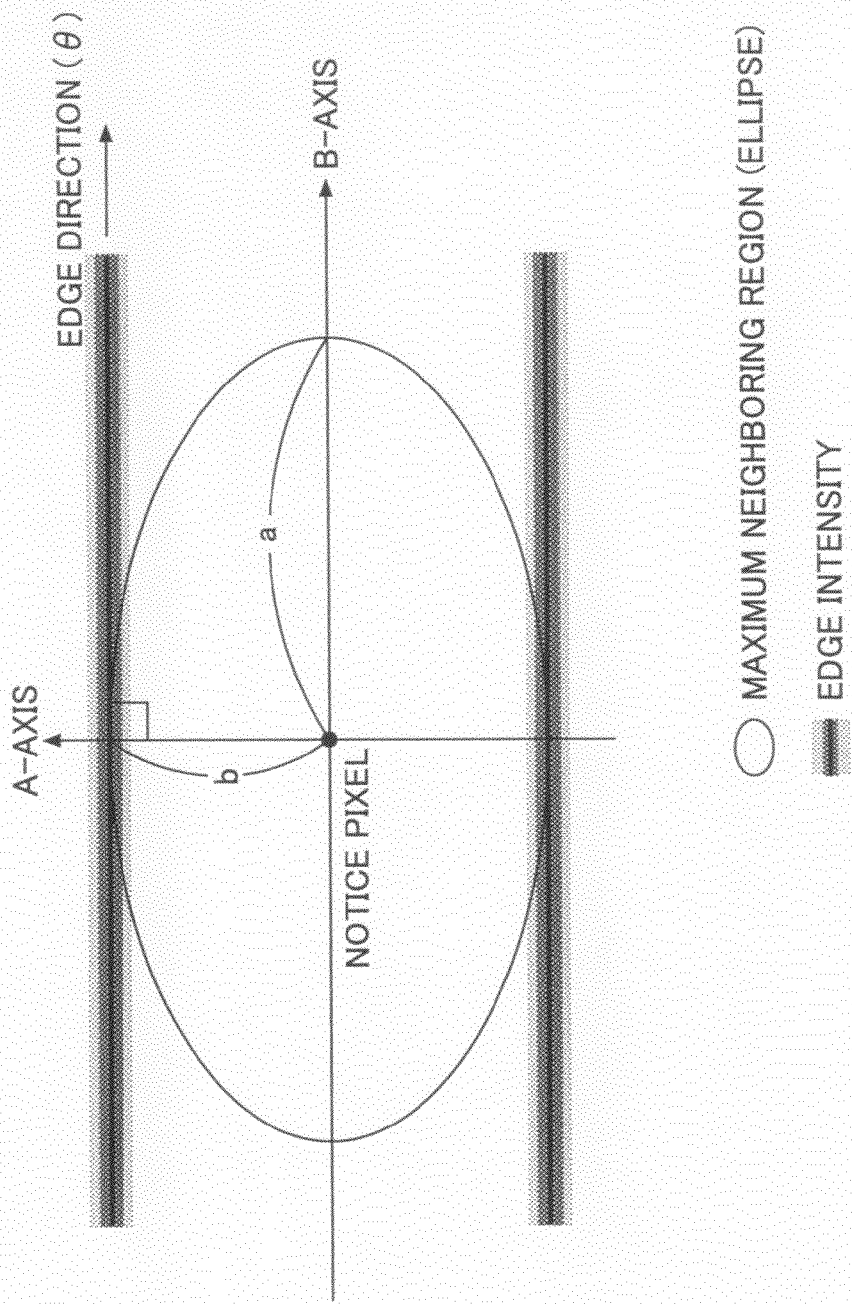

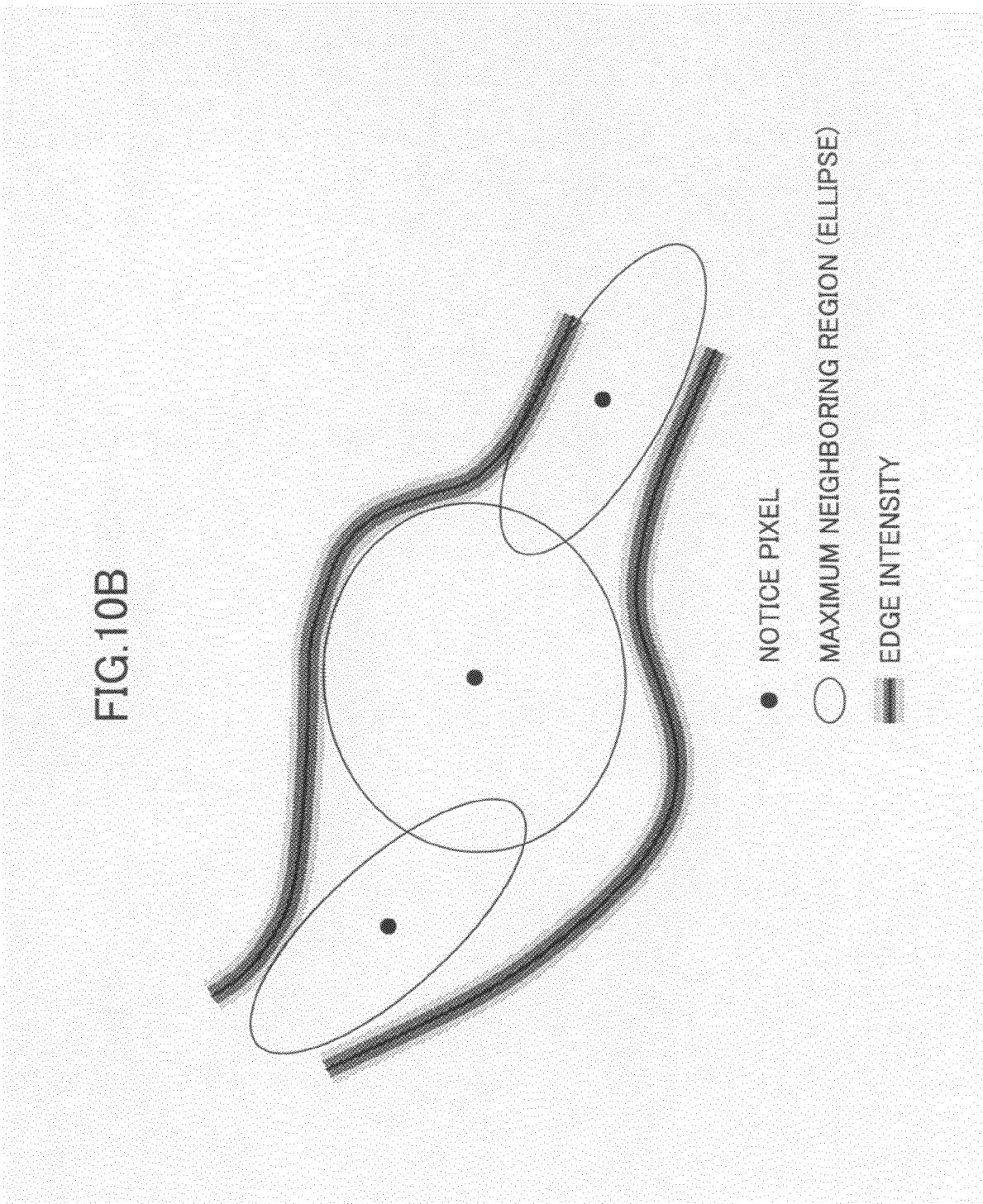

IMAGE PROCESSING UNIT, NOISE REDUCTION METHOD, PROGRAM AND STORAGE MEDIUM

BACKGROUND OF THE INVENTION

1. Field of the Invention

The present invention relates to an image processing unit, a noise reduction method, a program, and a recording medium for reducing noise of image data.

2. Description of the Related Art

In many cases, image data picked up by image pick-up equipment such as scanners and digital cameras contain noise due to the characteristics of image pick-up devices, such as a dark current and a residual current. Therefore, processing for reducing the noise is required. However, even if a low-pass filter or the like is used to simply reduce the noise, an important element such as an edge necessary for humans to perceive is blurred, which results in degradation of image quality. In view of this problem, technologies for processing noise for each region in accordance with the characteristics of each region of image data have been proposed (see, for example, Patent Document 1 through 4).

Patent Document 1 discloses an image processing unit that performs calculation of an edge and sharpening processing for correcting a space frequency based on the size of the edge in mutually different signal spaces. According to this technology, an image is transformed into a multiplex resolution space to perform filter processing, which in turn makes it possible to realize noise elimination and visually natural emphasis with respect to the image in a desired frequency band without emphasizing noise.

Furthermore, Patent Document 2 discloses a technology for extracting the size and the direction of the gradient of an edge from image data and selecting a preset filter in accordance with the size and the direction of the gradient.

Furthermore, Patent Document 3 discloses a technology for discriminating an edge region from a flat region and applying different filter processes to the regions.

Furthermore, Patent Document 4 discloses a technology for not performing noise reduction processing with respect to a pixel determined as an edge and changing filter characteristics with respect to other pixels in accordance with a distance to the closest edge and the intensity of the edge.

However, since the technologies disclosed in Patent Documents 1 through 3 do not use edge information in the vicinity of a pixel to be processed (a notice pixel), appropriate noise reduction suitable for a neighboring edge structure (arrangement of pixel values) cannot be performed.

Furthermore, since edge information is generally extracted from an image from which noise has not been eliminated, it is not possible to assure that all the edge information is correct. Accordingly, as described in Patent Document 2 through 4, if the edge cannot be correctly extracted when noise is eliminated at one pixel position where edge information is detected, degradation of image quality, such as excessive edge blurring or insufficient noise reduction, occurs.

Patent Document 1: JP-A-2004-282511
Patent Document 2: WO02/005544
Patent Document 3: JP-A-2005-142891
Patent Document 4: JP-A-2005-117449

SUMMARY OF THE INVENTION

In light of the above problems, the present invention may have an object of providing an image processing unit, a noise reduction method, a program, and a storage medium capable of performing noise reduction processing reflecting an edge structure in the vicinity of a pixel to be processed and obtaining a robust noise reduction result with respect to edge extraction accuracy.

According to an aspect of the present invention, there is provided an image processing unit that smoothens a notice pixel of input image data with pixel values of pixels around the notice pixel to reduce noise in the image data. The image processing unit includes an edge extraction unit that extracts an edge based on the pixel values of the image data; a region determination unit that determines a region to be processed where a sum of edge intensities of the pixels including the notice pixel becomes greater than or equal to a threshold; and a smoothening unit that changes a smoothening intensity in accordance with a size of the region to be processed to smoothen the notice pixel corresponding to the region to be processed.

According to another aspect of the present invention, there is provided a noise reduction method for smoothening a notice pixel of input image data with pixel values of pixels around the notice pixel to reduce noise in the image data. The noise reduction method includes a step in which an edge extraction unit extracts an edge based on a pixel value of the image data; a step in which a region determination unit determines a region to be processed where a sum of edge intensities of the pixels including the notice pixel becomes greater than or equal to a threshold; and a step in which a smoothening unit changes a smoothening intensity in accordance with a size of the region to be processed to smoothen the notice pixel corresponding to the region to be processed.

According to still another aspect of the present invention, there is provided a program that causes a computer to perform a step of inputting image data through an input unit; a step of scanning the image data stored in the storage unit and extracting an edge based on pixel values of the image data; a step of determining a region to be processed where a sum of edge intensities of pixels including a notice pixel becomes greater than or equal to a threshold; a step of changing a smoothening intensity for smoothening the pixel values in accordance with a size of the region to be processed to smoothen the notice pixel corresponding to the region to be processed; and a step of storing the smoothened image data in the storage unit.

According to still another aspect of the present invention, there is provided a computer-readable storage medium that has the program described above stored therein.

Other objects, features and advantages of the present invention will become more apparent from the following detailed description when read in conjunction with the accompanying drawings.

BRIEF DESCRIPTION OF THE DRAWINGS

FIG. 6A is a diagram showing an example of coefficients of a Prewitt filter;

FIG. 6B is a diagram showing an example of coefficients of a Sobel filter;

FIG. 9B is an example of a diagram schematically showing the Gaussian filter weighted in the edge direction θ;

FIG. 10A is an example of a diagram schematically showing the maximum neighboring region of an ellipse whose long axis is made parallel to the edge direction θ;

FIG. 10B is an example of a diagram for setting an elliptical neighboring region having the long axis in the edge direction θ with the length of the short axis limited to the length between edges;

DETAILED DESCRIPTION OF THE PREFERRED EMBODIMENTS

Hereinafter, a description is made of the best mode for carrying out embodiments of the present invention with reference to the accompanying drawings.

Figure 1:
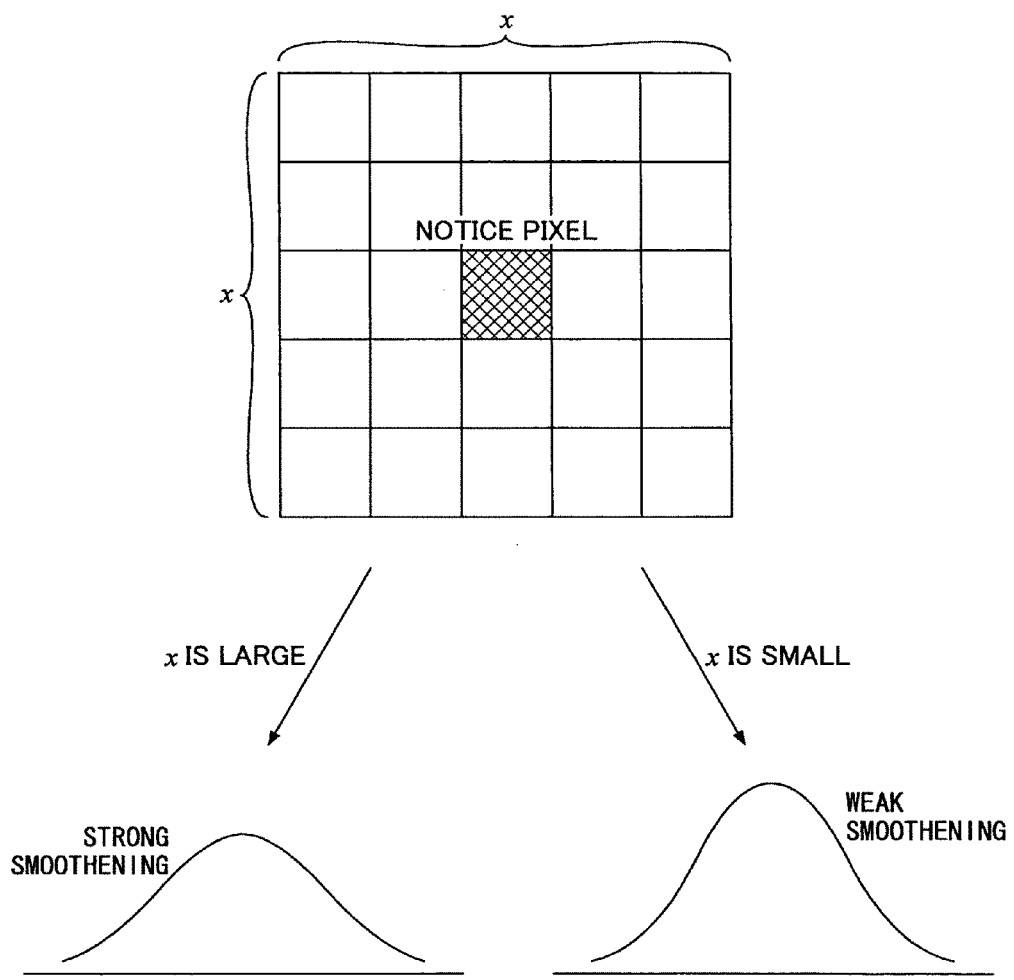
FIG. 1 is an example of a diagram schematically showing noise reduction processing.

FIG. 1 is an example of a diagram schematically showing noise reduction processing according to the embodiments of the present invention. First, an edge intensity is found for each pixel. Then, with attention paid to a notice pixel (a central pixel in FIG. 1), a maximum neighboring region where the sum of the edge intensities exceeds a threshold is found. In FIG. 1, the maximum neighboring region is indicated by an "x x x" pixel region. If regions around the notice pixel are image regions where a change in a pixel value is large, x becomes small. On the other hand, if the regions around the notice pixel are flat image regions where the change in the pixel value is smooth, x becomes large.

An image processing unit 100 according to the embodiments operates on the size (for example, the area) of the maximum neighboring region indexed by x in a filter to be smoothened. On the other hand, if x is small, the pixel value of the maximum neighboring region is weakly smoothened.

With this noise reduction processing, it is possible to perform noise processing related to an edge structure in the vicinity of the notice pixel. Furthermore, even if detected edge intensities are inaccurate due to noise, the maximum neighboring region where the sum of the edge intensities exceeds a threshold is found. Therefore, it is possible to reduce an error in the edge intensities due to the noise and realize robust noise reduction processing with respect to the noise.

Furthermore, as described below, the image processing unit 100 adjusts a smoothening intensity in accordance with an edge direction. In other words, the image processing unit 100 strongly smoothens a pixel value in the direction parallel to the edge direction and weakly smoothens the pixel value in the direction orthogonal to the edge direction. Thus, it is possible for the image processing unit 100 to perform noise reduction processing while maintaining the edge structure.

(An Example of Equipment to which the Image Processing Unit 100 is Applied)

Figure 2:
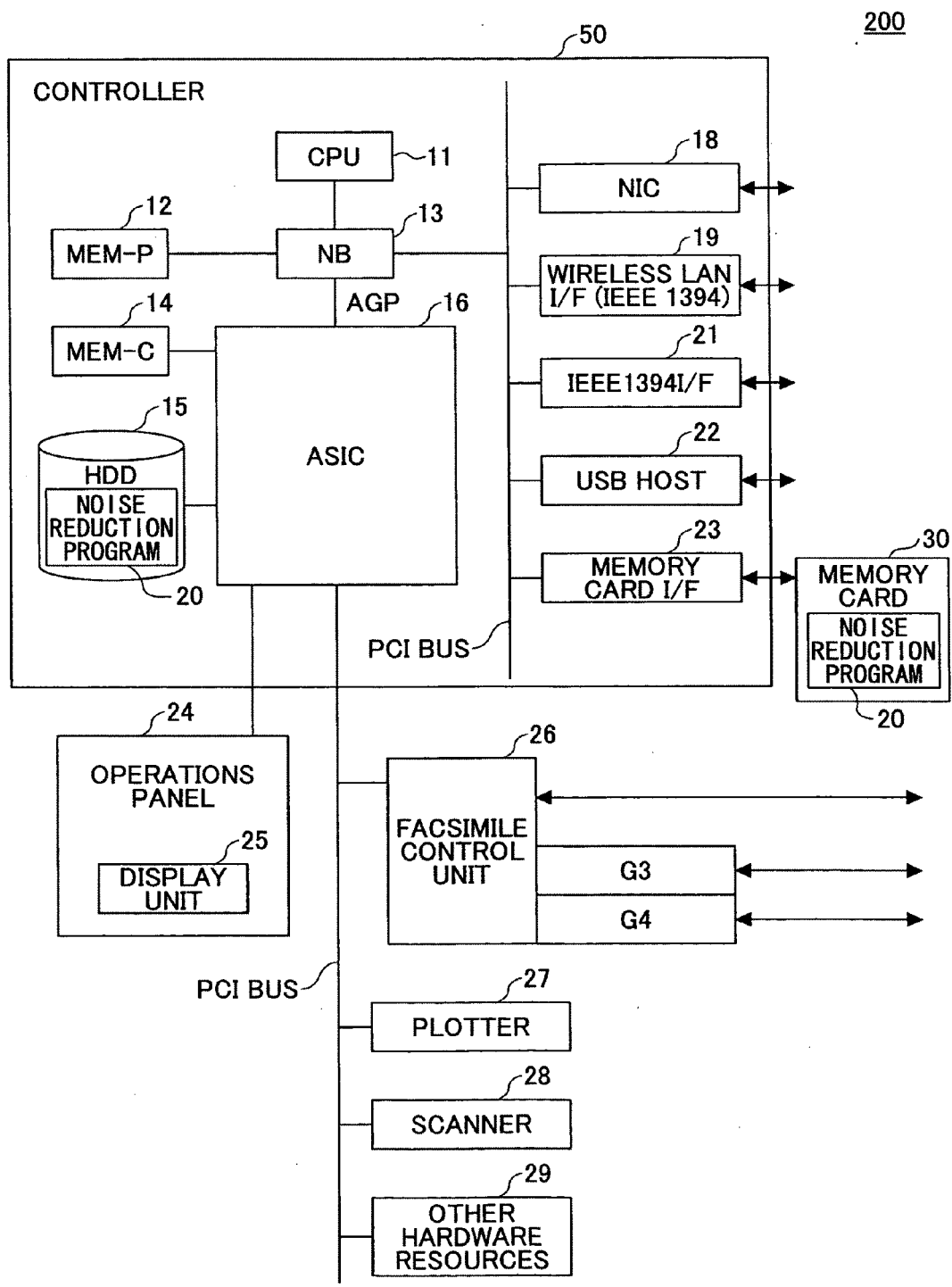
FIG. 2 is an example of the hardware configuration diagram of an image forming apparatus.

FIG. 2 is an example of the hardware configuration diagram of an image forming apparatus 200. As the hardware configuration of the image forming apparatus 200, a known one is available. The image forming apparatus 200 is an example of equipment having the image processing unit 100 and may be a digital camera that mainly performs scanning of image data. Furthermore, the image forming apparatus 200 is a scanner, a printer, a facsimile machine, or a copier, each of which has the scanner, or a MFP (Multifunction Peripheral) having at least one or more functions of the scanner, the printer, the facsimile machine, and the copier. In other words, the image forming apparatus 200 may not necessarily have an image forming function. Furthermore, the image forming apparatus 200 is required to perform only noise reduction processing on image data and may be a so-called information processing apparatus (a computer) to which image data can be input.

In the image forming apparatus 200, a controller 50 is connected to a plotter 27, a scanner 28, a facsimile control unit 26, and other hardware resources 29 through a serial inter bus (such as a PCI bus and a PCI-Express). Furthermore, an operations panel 24 controlled by the user is connected to the controller 50.

The controller 50 serves as a unit for entirely controlling the image forming apparatus 200; it performs scanning of a document 41 to be processed (hereinafter referred to as the document 41), printing operations, facsimile transmitting and receiving operations, inputting operations through the operations panel 24, and the like by using the facsimile control unit 26, the plotter 27, the scanner 28, and the other hardware resources 29.

The plotter 27 is a black and white plotter and/or a 1-drum color plotter. The plotter 27 forms an image for each page based on print job data and image data scanned by the scanner 28 and transfers the image to a sheet. A toner image formed on a photosensitive drum or the like is transferred to a sheet by, for example, an electrophotographic process using laser beams. The toner image is fixed by heat and pressure of a fixing unit and then output.

Furthermore, the scanner 28 optically scans the document 41 placed on a contact glass and A/D-converts its reflection light to be subjected to known image processing (for example, scanner γ processing), and then converts it into digital data having predetermined resolution to generate image data. These image data are temporarily stored in a HDD 15 and then subjected to the noise reduction processing described below by an ASIC (Application Specific Integrated Circuit) 16.

The facsimile control unit 26 is connected to a public communication network through a NCU (Network Control Unit) and performs the transmitting and receiving operations of a facsimile machine in accordance with a communication procedure (a communication protocol) or the like corresponding to, for example, the G3 or G4 facsimile standard. The facsimile control unit 26 applies signal processing, such as data compression and modulation to image data, to perform the transmitting operation. Furthermore, the facsimile control unit 26 applies data expansion, error correction, or the like to the image data received from the party at the other end to perform the restoration of image data.

The controller 50 has a CPU 11, a NB (North Bridge) 13, a MEM-P 12, a MEM-C 14, the ASIC 16, and a hard disk drive (hereinafter referred to as the HDD 15). Furthermore, the controller 50 has a NIC (Network Interface Card) 18 that provides an interface with the outside, a wireless LAN I/F 19, an IEEE 1394 I/F 21, a USB host 22, and a memory card I/F 23.

The CPU 11 controls the entire image forming apparatus 200 through the NB 13 that performs transmission control of data distributed to a bus connecting the MEM-P12, the ASIC 16, the USB host 22, and the like to each other. Furthermore, the CPU 11 executes a noise reduction program 20 stored in the HDD 15 to implement the functions described below.

The NB 13 is a bridge IC for connecting the CPU 11, the MEM-P12, and the AGP to each other. The MEM-P12 is a system memory used as a drawing memory for the image processing unit 100.

The MEM-C14 is a local memory used as an image buffer for copying and a code buffer. The ASIC 16 has multiple registers and logic circuits and serves as a control unit for motor drivers, a head pulse generation unit, and the like. Furthermore, the ASIC 16 serves also as a bridge for connecting the AGP, the HDD 15, and the MEM-C14 to each other.

The operations panel 24 is an operations unit where input operations from the user are received and a message for the user is displayed. The operations panel 24 has a touch panel as an input unit besides a keyboard and serves also as a display unit 25 of a LCD (Liquid Crystal Display).

The HDD 15 serves as a storage unit that stores image data, an OS, and applications, fonts, and the like. According to the embodiments, a noise reduction program 20 is stored in the HDD 15. The noise reduction program 20 is distributed in a memory card 30 and installed in the HDD 15, or it is downloaded from a server and installed in the HDD 15. Note that the memory card 30 refers to, for example, a USB memory, a SD card, a multimedia card, an xD card, or the like.

(The Image Processing Unit 100)

Figure 3:
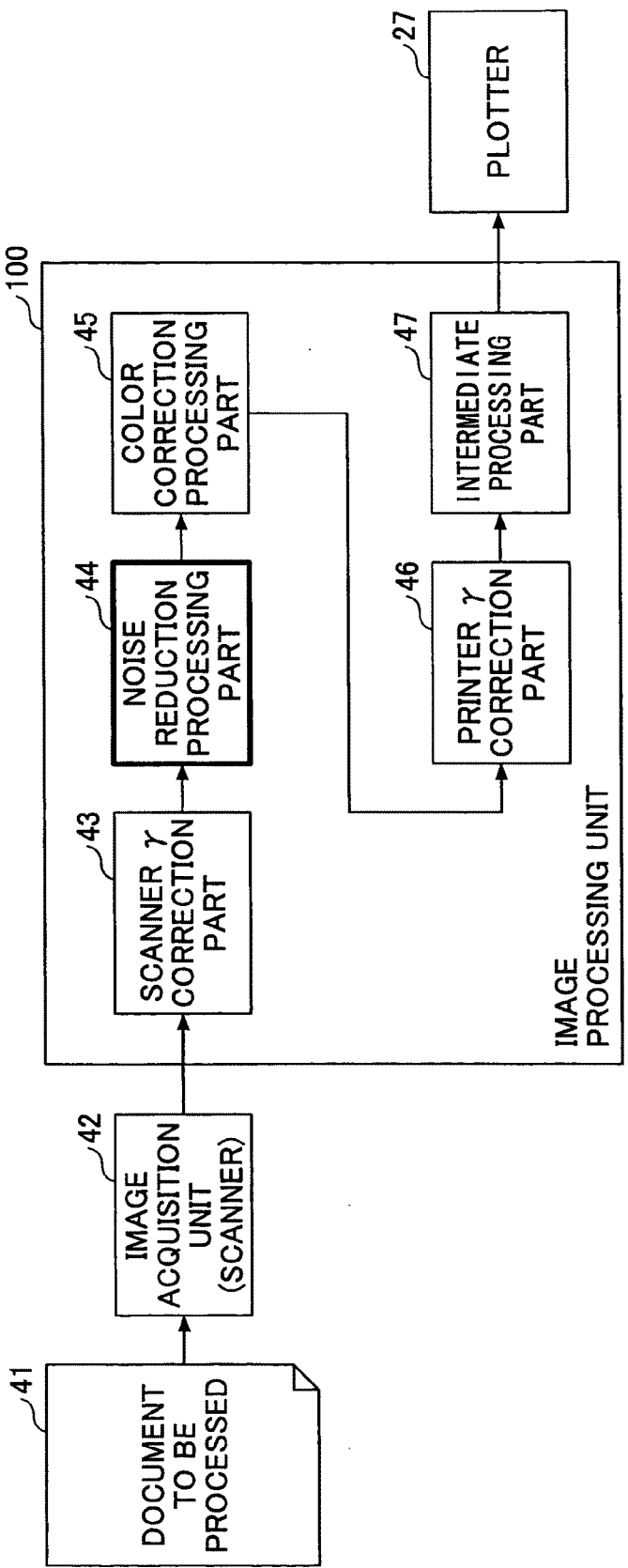
FIG. 3 is an example of a block diagram showing the configuration of an image processing unit.

FIG. 3 is an example of a block diagram showing the configuration of the image processing unit 100. As the entire procedure of image processing, a known one is used. A typical example of an image acquisition unit 42 is the scanner described above. Furthermore, when the image processing unit 100 applies the noise reduction processing to the image data of the document 41 scanned by the scanner 28, units for scanning the image data, such as the NIC 18, the wireless LAN I/F 19, and the memory card 30, correspond to the image acquisition unit 42.

When the user presses a copy button through the operations panel 24 to start a document scanning operation, the controller 50 supplies an instruction for scanning an image to the scanner 28 and respective components. The scanner 28 lights an optical source, prepares for driving a carriage, rotates a polygon mirror, starts an image pickup device such as a CCD, and the like. When an image to be processed is scanned in color, light beams of three colors, of which the corresponding light sources have the central wavelengths of three primary colors, are successively irradiated from one exposure position in a sub-scanning direction. In the image pickup device, light receiving sensors are arranged in a line in a main scanning direction and received data are stored in a buffer for every row in the main scanning direction. The image pickup device picks up analog data proportional to a light amount obtained when the light beam is reflected by the document 41. The analog data are A/D-converted to be digital data.

The scanner 28 intermittently drives the carriage in the sub-scanning direction at a set speed with a stepping motor and successively scans the entire surface of the document 41. With the above scanning in the main scanning direction and repetitive movements in the sub-scanning direction, the scanner 28 can scan the entire surface of the document as a two-dimensional image. The scanned image data are temporarily stored in the HDD 15.

The image processing unit 100 has a scanner γ correction part 43, a noise reduction processing part 44, a color correction processing part 45, a printer γ correction part 46, and an intermediate processing part 47.

The image data optically scanned by the image acquisition unit 42 are converted into density-linear or brightness-linear image data for each color by the scanner γ correction part 43. A gradient is expressed as an eight-bit quantity (0 through 255) for each of the RGB colors. The scanner γ correction part 43 generally performs correction processing by referring to a LUT (Look Up Table) or the like. The image data corrected by the scanner γ correction part 43 are sent to the noise reduction processing part 44 for the noise reduction processing.

The image data output from the noise reduction processing part 44 are converted into a CMY signal by the color correction processing part 45. Then, the image data are input to the printer γ correction part 46 and converted into data so as to have a desired density characteristic. After that, the data are converted into multi-valued or binary image data through a dither processing method or an error diffusion method by the intermediate processing part 47. The image data are finally printed on a sheet by the plotter 27.

First Embodiment

This embodiment refers to the image processing unit 100 that searches for a neighboring region with a notice pixel as a center so as to form a rectangular shape and represents the area of a maximum neighboring region, where the sum of obtained edge intensities exceeds a threshold, on the variance parameter of a Gaussian filter to perform smoothening processing.

The neighboring region is composed of one or more neighboring pixel regions including the notice pixel and is formed into a rectangle in this embodiment. Furthermore, the maximum neighboring region is a neighboring region where the sum of edge intensities exceeds a threshold. Therefore, if the edge intensity of the notice pixel is greatly changed, one pixel could form the maximum neighboring region at minimum. On the other hand, if the edge intensities of neighboring regions of the notice pixel are small, the maximum neighboring region becomes large.

Figure 4:
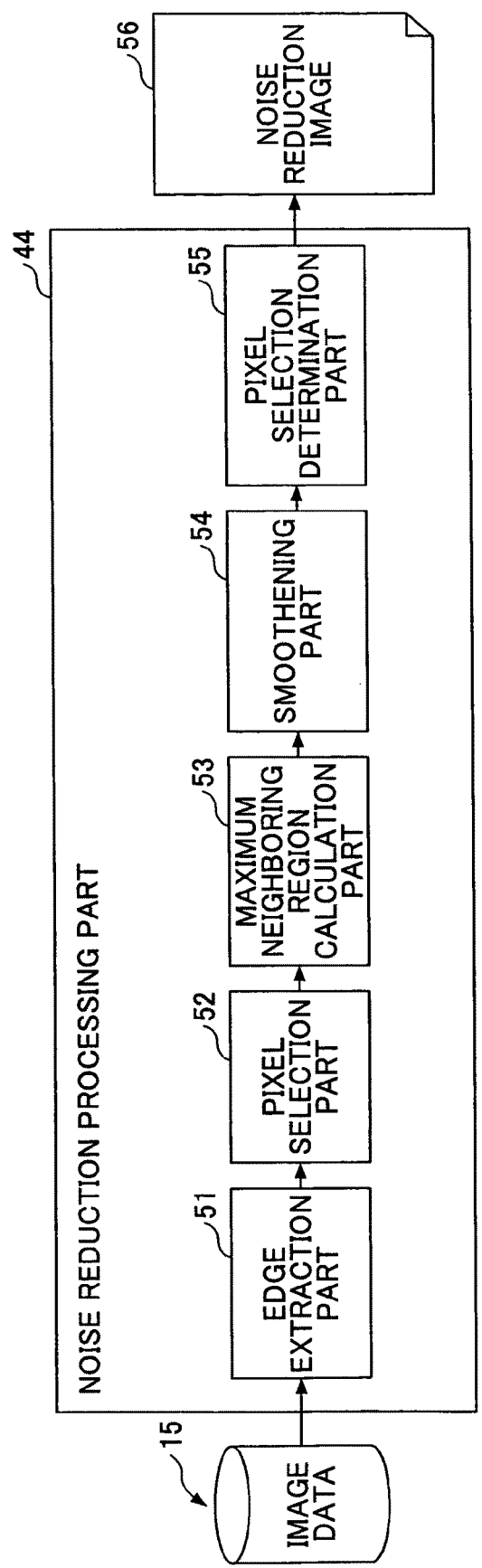
FIG. 4 is an example of a functional block diagram of a noise reduction processing part.
Figure 5:
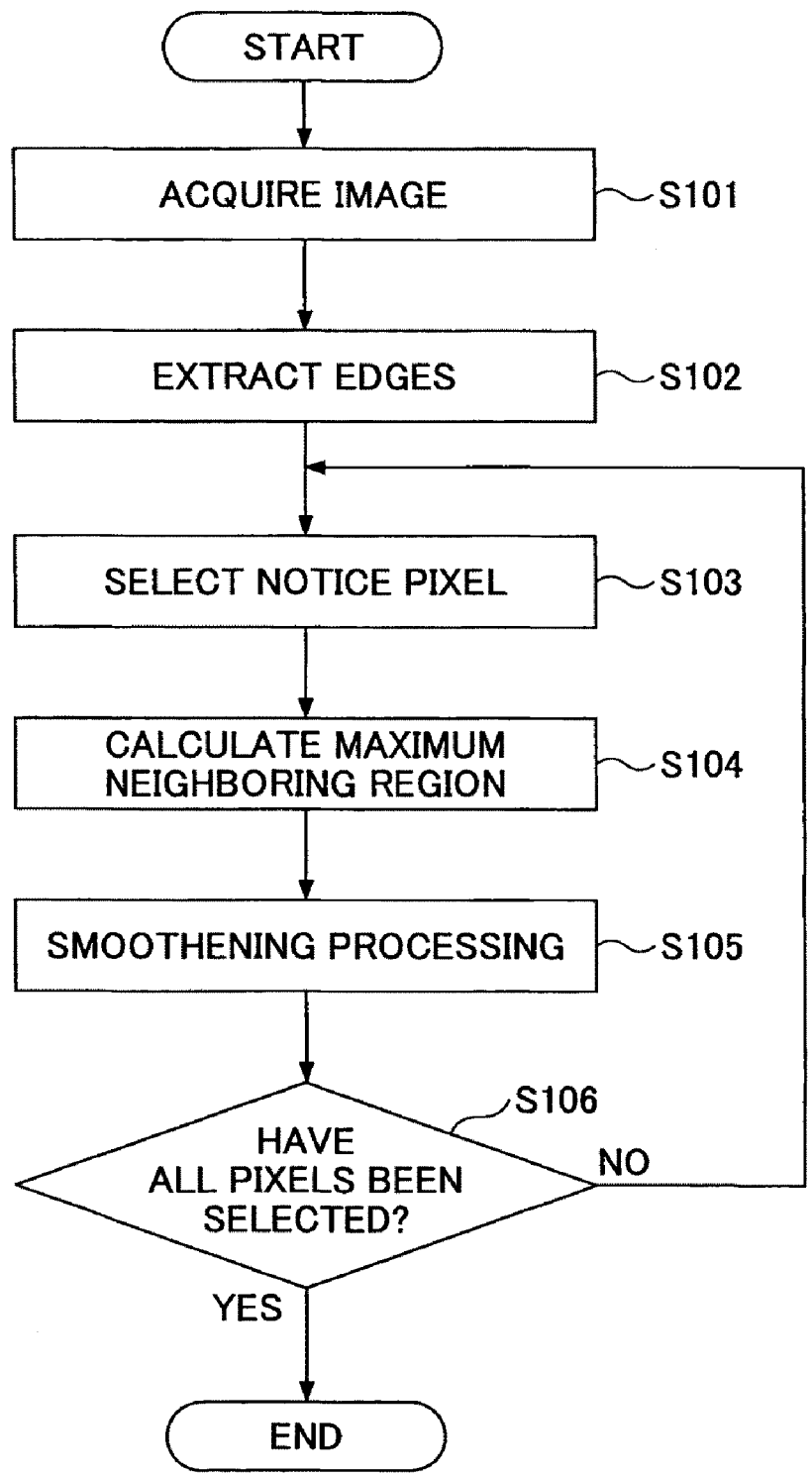
FIG. 5 is an example of a flowchart showing a processing procedure using the noise reduction processing part.

FIG. 4 is an example of a functional block diagram of the noise reduction processing part 44, and FIG. 5 is an example of a flowchart showing a processing procedure using the noise reduction processing part 44. The noise reduction processing part 44 applies a series of the processes described below to image data stored in the HDD 15 and outputs a noise reduction image 56. The noise reduction processing part 44 has an edge extraction part 51, a pixel selection part 52, a maximum neighboring region calculation part 53, a smoothening part 54, and a pixel selection determination part 55. Next, the processing procedure is described with reference to the flowchart.

(S101)

In step S101, the image acquisition unit 42 scans the document 41 to generate image data based on the above procedure.

(S102)

In step S102, the edge extraction part 51 extracts edges from the image data of the document 41. A known method can be used to extract the edges. As a filter for extracting the edges, differential filters such as a Prewitt filter and Sobel filter are known. FIG. 6A is a diagram showing coefficients of the Prewitt filter, and FIG. 6B is a diagram showing coefficients of the Sobel filter. The filters on the left side in FIGS. 6A and 6B show differential values (by which a horizontal edge is obtained) in a vertical direction, and the filters on the right side in FIGS. 6A and 6B show differential values (by which a vertical edge is obtained) in a horizontal direction. The edge extraction part 51 extracts the pixel values of, for example, 3×3 pixel regions with the notice pixel as a center and multiplies the pixel values by the Prewitt filter or the Sobel filter to sum up components. Thus, the edge extraction part 51 calculates the differential values in the vertical and horizontal directions in the notice pixel.

Assuming that the differential value in the vertical direction is fx and the differential value in the horizontal direction is fy, an edge intensity E is defined by the following formula.

$$\text{Edge intensity } E = \text{sqrt}(fx*fx + fy*fy) \tag{1}$$

Figure 7:
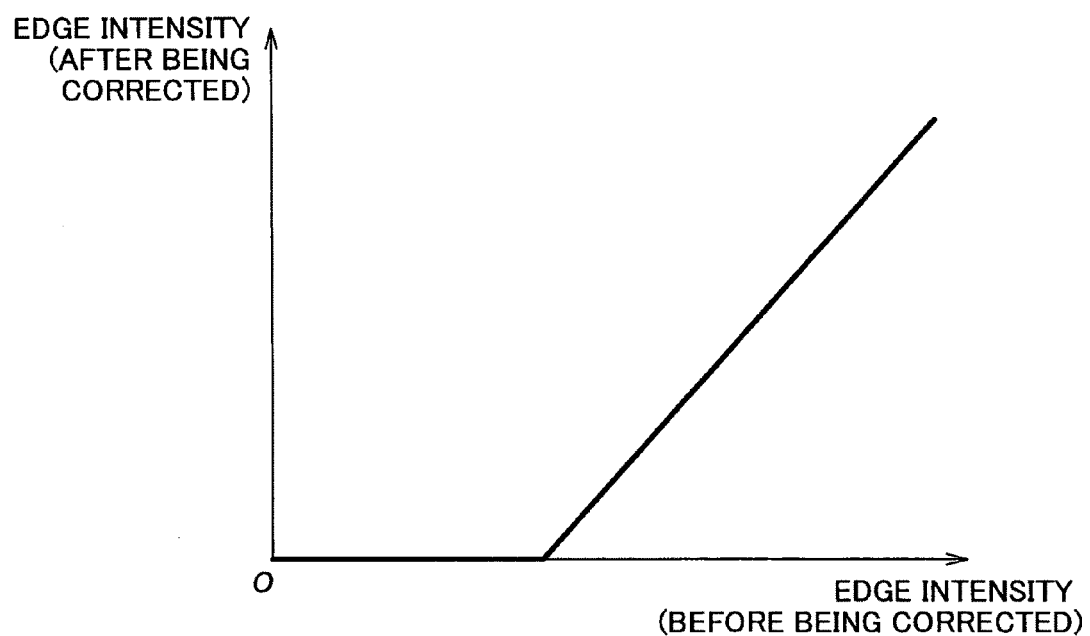
FIG. 7 is a diagram showing an example of the correction function of an edge intensity.

Note that the edge intensity E may be corrected to reduce an influence by noise. FIG. 7 is a diagram showing an example of the correction function of the edge intensity E. In FIG. 7, even if the edge intensity before being corrected becomes large to some extent, the edge intensity after being corrected remains zero. In other words, the edge extraction part 51 can correct the edge intensity E, whose value is less than or equal to a predetermine value, to zero. The edge intensity E may show a high value in response to noise. Therefore, as shown in FIG. 7, the edge extraction part 51 recognizes the edge intensity E whose value is less than or equal to a predetermined value as zero. Thus, the edge intensity E where an influence by noise is reduced can be obtained.

The edge extraction part 51 prepares, for example, a two-dimensional array corresponding to the pixels of image data and stores the extracted edge intensities E so as to correspond to the respective pixels. Thus, the edge intensities E for the pixels are obtained.

(S103)

In step S103, the pixel selection part 52 selects one notice pixel from the image data of the document 41. The notice pixel may be selected in any order such as a raster scanning order. The neighboring region is searched for with the notice pixel selected in step S103 as a center.

(S104)

In step S104, the maximum neighboring region calculation part 53 determines (calculates) the maximum neighboring region. As described above, the maximum neighboring region is composed of the plural pixel regions in the vicinity of the notice pixel where the sum of the edge intensities E exceeds a threshold. Therefore, the sum of the edge intensities E may be calculated in such a manner that the pixel regions are gradually extended with the notice pixel as a center.

The maximum neighboring region calculation part 53 finds the sum of the edge intensities E in the rectangle of n×n (where n is an integer of one or greater) pixel regions with the notice pixel as a center. Then, the maximum neighboring region calculation part 53 determines whether the sum of the edge intensities E exceeds a threshold. When it is determined that the sum of the edge intensities E exceeds the threshold, the maximum neighboring region calculation part 53 stores n at that time in the memory (for example, the MEM-C14) as "x." When it is determined that the sum of the edge intensities E does not exceed the threshold, the maximum neighboring region calculation part 53 increases n by two and calculates the sum of the edge intensities E. In this manner, the maximum neighboring region calculation part 53 repeatedly determines whether the sum of the edge intensities E exceeds the threshold. Note that n is increased in increments of two because the neighboring region is increased in increments of one in each of the horizontal and vertical directions with the notice pixel as a center.

Furthermore, as a method for calculating the sum of the edge intensities E of the neighboring region, it is also possible to assign weights to the pixel regions in accordance with their positions instead of uniformly calculating the sum of the edge intensities E. If a greater weight is assigned to the pixel regions closer to the notice pixel, it is possible to easily determine the maximum neighboring region indicating an edge structure.

(S105)

In step S105, the smoothening part 54 applies smoothening processing to the image data of the document 41. In many cases, a filter is used to perform the smoothening processing. The smoothening part 54 reflects x representing the size of the maximum neighboring region on the filter. That is, the smoothening part 54 more strongly smoothens the image data as x is larger. More specifically, a Gaussian filter is used to perform the smoothening processing. The Gaussian filter is a filter that assigns a greater weight to the pixel regions closer to the notice pixel and a smaller weight to the pixel regions far from the notice pixel. The Gaussian filter determines the degree of a weight in accordance with a Gauss function.

Let it be assumed that the Gauss function is represented by the following formula. Here, the smoothening processing e can be more strongly performed as σ (standard deviation) is larger. Accordingly, σ becomes a variance parameter for determining a smoothening intensity. For example, if σ is about less than or equal to one, the smoothening processing is weakly performed. If σ is about one or two, the smoothening processing is moderately performed. If σ is greater than or equal to two, the smoothening processing is strongly performed. Note that (p,q) is the coordinate position of the pixel next to the central component (corresponding to the notice pixel) of the Gaussian filter wherein p and q can be positive and negative integers.

$$f(p,q) = \exp(-(p^2+q^2)/2\sigma^2) \tag{2}$$

Accordingly, it is only required that the above-described x representing the size of the maximum neighboring region be reflected in a. The smoothening part 54 calculates the standard deviation a based on, for example, the following formulae and determines the Gaussian filter. Note that k and h are constants stored in advance and are positive values.

$$\sigma = k \cdot x^2 + h \tag{3}$$

$$\sigma = k \cdot x + h \tag{3'}$$

The smoothening part 54 determines the respective components of the Gaussian filter by using the function f(p,q) of the formula (2). If the values of the coordinate position (p,q) are each in the range of "−1 through 1," a "3×3" Gaussian filter is obtained. If the values of the coordinate position (p,q) are each in the range of "−2 through 2," a "5×5" Gaussian filter is obtained.

The smoothening part 54 determines the components of the Gaussian filter based on the function f(p,q) so as to obtain the components the same in number as the components of the maximum neighboring region. Then, the smoothening part 54 corrects and normalizes the components of the Gaussian filter so that the sum of the components of the function f(p,q) becomes one. The following matrix shows an example of the "3×3" Gaussian filter.

| | | |
|------|------|------|
| 0.07 | 0.12 | 0.07 |
| 0.12 | 0.2  | 0.12 |
| 0.07 | 0.12 | 0.07 |

Note that, for example, the "3×3," "5×5," or "7×7" Gaussian filter may be created in advance in accordance with the size of the maximum neighboring region.

Finally, the smoothening part 54 applies filtering processing to the notice pixel by using the calculated Gaussian filter. The smoothening part 54 multiplies the respective components of the Gaussian filter by the pixel values of the pixels of the maximum neighboring region and sets the sum to the pixel value of the notice pixel.

(S106)

In step S106, the pixel selection determination part 55 determines whether all the pixels of the image to be processed have been selected as the notice pixels. If it is determined that all the pixels have been selected as the notice pixels, the processing procedure is ended. If not, the processing procedure is repeated from step S103. The noise reduction image 56 of which all the pixels have been selected as the notice pixels is stored in the HDD 15.

As described above, the image processing unit 100 according to this embodiment more strongly performs the smoothening processing as the area of the neighboring region where the sum of the edge intensities E exceeds a threshold is larger. On the other hand, the image processing unit 100 weakly performs the smoothening processing as the area of the neighboring region is smaller. Therefore, the image processing unit 100 can efficiently reduce noise in the region having a small edge structure. Furthermore, if the edge structure is large, the image processing unit 100 can easily preserve the edge structure. In other words, it is possible to perform the noise processing taking into account the edge structure in the vicinity of the notice pixel. Furthermore, even if the detected edge intensities E are inaccurate due to noise, the maximum neighboring region where the sum of the edge intensities E exceeds a threshold is found. Therefore, it is possible to reduce an error in the edge intensities E due to the noise and realize robust noise reduction processing with respect to noise.

Note that in this embodiment, the neighboring region is formed into a rectangle. However, the neighboring region may be formed into a circle. In this case, the square of the radius (x/2) of the maximum neighboring region may be used in the variance parameter (standard deviation $\sigma$) of the Gaussian filter. If the maximum neighboring region is formed into a circle, the regions to be smoothened can be determined at equal distance from the notice pixel.

Furthermore, besides the Gaussian filter, an average filter may be used to perform the smoothening processing. In this case, the average filter the same in size as x of the maximum neighboring region is created and normalized in accordance with the number of components. Accordingly, even when the average filter is used, it is possible to average the notice pixel with the neighboring pixels in accordance with the size of the maximum neighboring region.

Second Embodiment

In the first embodiment, n is increased in increments of two so as to find the maximum neighboring region. However, according to this method, the smoothening intensity may not be finely adjusted in some cases because the size of the neighboring region is discretely changed. In view of this problem, this embodiment refers to the image processing unit 100 that can specifically calculate the size of the maximum neighboring region by using an interpolating method.

Note that similar to the first embodiment, this embodiment uses the functional block diagram of the noise reduction processing part 44 shown in FIG. 4 and the flowchart shown in FIG. 5. This embodiment is characterized by step S104 in the flowchart.

(S104)

The maximum neighboring region calculation part 53 finds the sum of the edge intensities E in the rectangle of "n×n" pixel regions with the notice pixel as a center. Similar to the first embodiment, the maximum neighboring region calculation part 53 starts with n=1 and then increases n in increments of two. Let it be assumed that n when the sum of the edge intensities E in the rectangle first exceeds a threshold is N, the sum of the edge intensities E in the rectangle at that time is $S_1$, and the sum of the edge intensities E in the rectangle of "N−2×N−2" pixel regions is $S_0$.

Where n=N, the edge intensity E is $S_1$

Where n=N−2, the edge intensity E is $S_0$

In this embodiment, the maximum neighboring region where the sum of the edge intensities E becomes equal to a threshold is found. In other words, the next discrete n exceeding the threshold is not set to x for determining the maximum neighboring region, but this embodiment determines the neighboring region (maximum neighboring region) where the sum of the edge intensities E corresponding to the threshold is obtained. Accordingly, the sum of the edge intensities E corresponds to the threshold.

Figure 8:
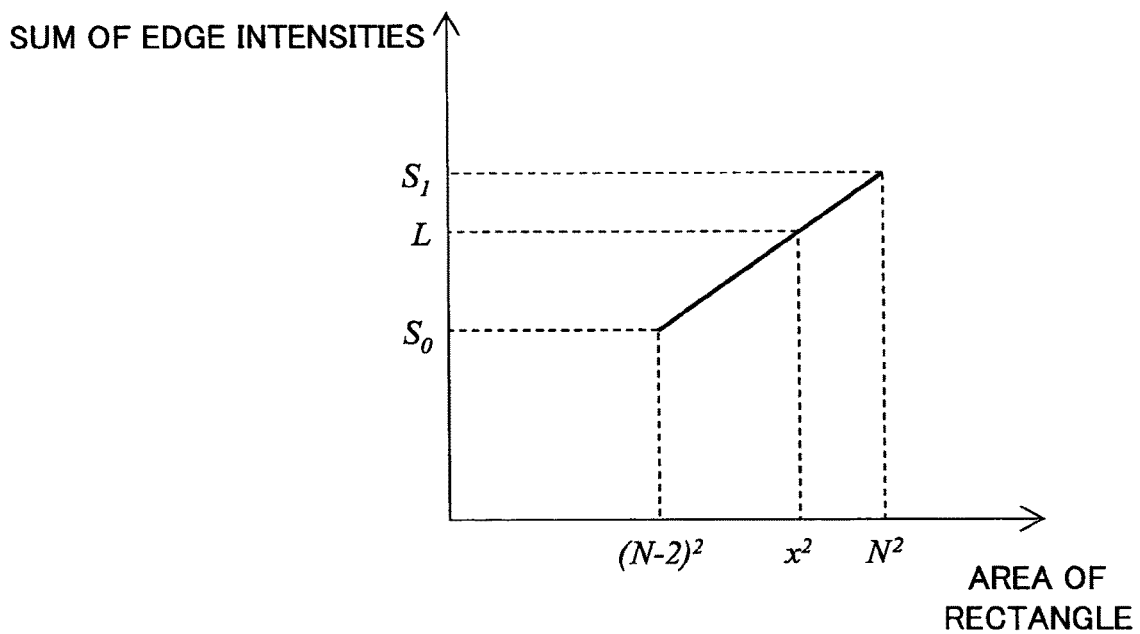
FIG. 8 is an example of a diagram for determining a neighboring region where the sum L of any edge intensities is equal to a threshold.

FIG. 8 is a diagram for determining the neighboring region where the sum L of the edge intensities E is equal to a threshold. The edge intensity E where the sum of the edge intensities E is N is $S_1$, and the edge intensity E where the sum of the edge intensities E is N−2 is $S_0$. Therefore, the neighboring region n where the sum of the edge intensities E is L can be found by interpolation. Note that $S_1$ and $S_0$ as the sum of the edge intensities E include the dimensions of the areas when the edge intensities E are summed up. For this reason, a function, which makes a correlation between $S_1$ corresponding to N and S corresponding to N−2, becomes a designated function (square). Therefore, each of N and N−2 is squared to formulate a linear correspondence.

With the formulation of the linear correspondence, a linear relationship between the sum of the edge intensities E and the square of the areas of the neighboring region is obtained as shown in FIG. 8. Based on this relationship, the maximum neighboring region calculation part 53 obtains the area $x^2$ of the neighboring region where the sum of the edge intensities E is L by the following formula.

$$x^2=[\{(S_1-L)(N-2)^2\}+(L-S_0)N^2]/(S_1-S_0)$$

$x^2$ on the left-hand side of the formula represents the size (area) of the maximum neighboring region where the sum of the edge intensities E is equal to L.

The following processing procedure is the same as the processing procedure in the first embodiment. The smoothening part 54 can smoothen the rectangle region defined by the maximum neighboring region with the Gaussian filter or the average filter. Note that even if the neighboring region is formed into a shape such as a circle other than a rectangle, x can be found by the same interpolation processing. Therefore, it is possible to apply the smoothening processing to the circular maximum neighboring region of a circular shape.

Third Embodiment

In the first and second embodiments, the maximum neighboring region is determined based on only the edge intensities E, and the size of the maximum neighboring region is used in the variance parameter of the Gaussian filter. This embodiment refers to the image processing unit 100 that can include the direction of the edges on the Gaussian filter.

Note that similar to the first embodiment, this embodiment uses the functional block diagram of the noise reduction processing part 44 shown in FIG. 4 and the flowchart shown in FIG. 5. This embodiment is characterized by the smoothening processing in step S105 in the flowchart.

(S105)

The direction of the edges (hereinafter referred to as an edge direction θ) is set based on, for example, a horizontal direction (zero degrees) as a reference. In this case, the edge direction θ of the edges successively arranged in a vertical direction is set at 90 degrees, and the edge direction θ of the edges successively arranged in the horizontal direction is set at zero degree. Furthermore, the normal direction of any edge can be calculated from the ratio of differential values fx to fy in the vertical and horizontal directions obtained by a differential filter such as a Prewitt filter and a Sobel filter.

The normal direction of the edges=arctan(fy/fx)

The direction orthogonal to the normal direction of the edges is the edge direction θ. Therefore, if fx>>fy, the relationship θ≈0 is established. On the other hand, if fx<<fy, the relationship θ≈90 is established.

In other words, the noise reduction processing part 44 strongly applies the smoothening processing in the direction parallel to the edge direction θ so that noise can be effectively reduced. Furthermore, the noise reduction processing part 44 weakly applies the smoothening processing in the direction orthogonal to the edge direction θ so that the edges can be preserved.

In order to perform the noise reduction processing, the noise reduction processing part 44 uses an anisotropic Gaussian filter to reduce a change in the components in the direction parallel to the edge direction θ and increase a change in the components in the direction orthogonal to the edge direction θ. The following formula (4) is an example of a formula for setting the Gaussian filter weighted in accordance with the edge direction θ.

$$G(p, q) = \frac{1}{Z}\exp\left\{-\frac{1}{2}\left(R_\theta\begin{pmatrix}p\\q\end{pmatrix}\right)^T\begin{pmatrix}x^2 & 0 \\ 0 & (e^{-cx^2}+1)x^2\end{pmatrix}^{-1}\left(R_\theta\begin{pmatrix}p\\q\end{pmatrix}\right)\right\} \quad (4)$$

$$R_\theta = \begin{pmatrix}\cos\theta & -\sin\theta \\ \sin\theta & \cos\theta\end{pmatrix}$$

Since the edge direction θ in the neighboring region is not necessarily constant, the smoothening part 54 sets the average in the edge direction of the notice pixel or in the edge direction around the notice pixel to θ. Furthermore, the size parameter of the neighboring region is defined as x, the normalized constant is defined as Z, and the positive constant is defined as c. Similar to the formula (2), (p,q) is the coordinate position of the pixel next to the notice pixel. Considering that Rθ is a rotating matrix, it is possible to set the Gaussian filter weighted in a θ direction. The components of the Gaussian filter are determined based on the constant c and the normalized constant Z. However, in the formula (4), "$e^{-cx^2}+1$" increases as x is smaller, and approximates one if x is large enough. Accordingly, if x is small and the maximum neighboring region is narrow, a large weight is assigned in the θ direction. On the other hand, if x is large and the maximum neighboring region is wide, the components of the Gaussian filter are the same irrespective of the direction. As a result, the smoothening processing can be isotropically realized. Furthermore, with a term of "$x^2$," the smoothening processing can be strongly applied as the size of the maximum neighboring region is larger.

Figure 9A:
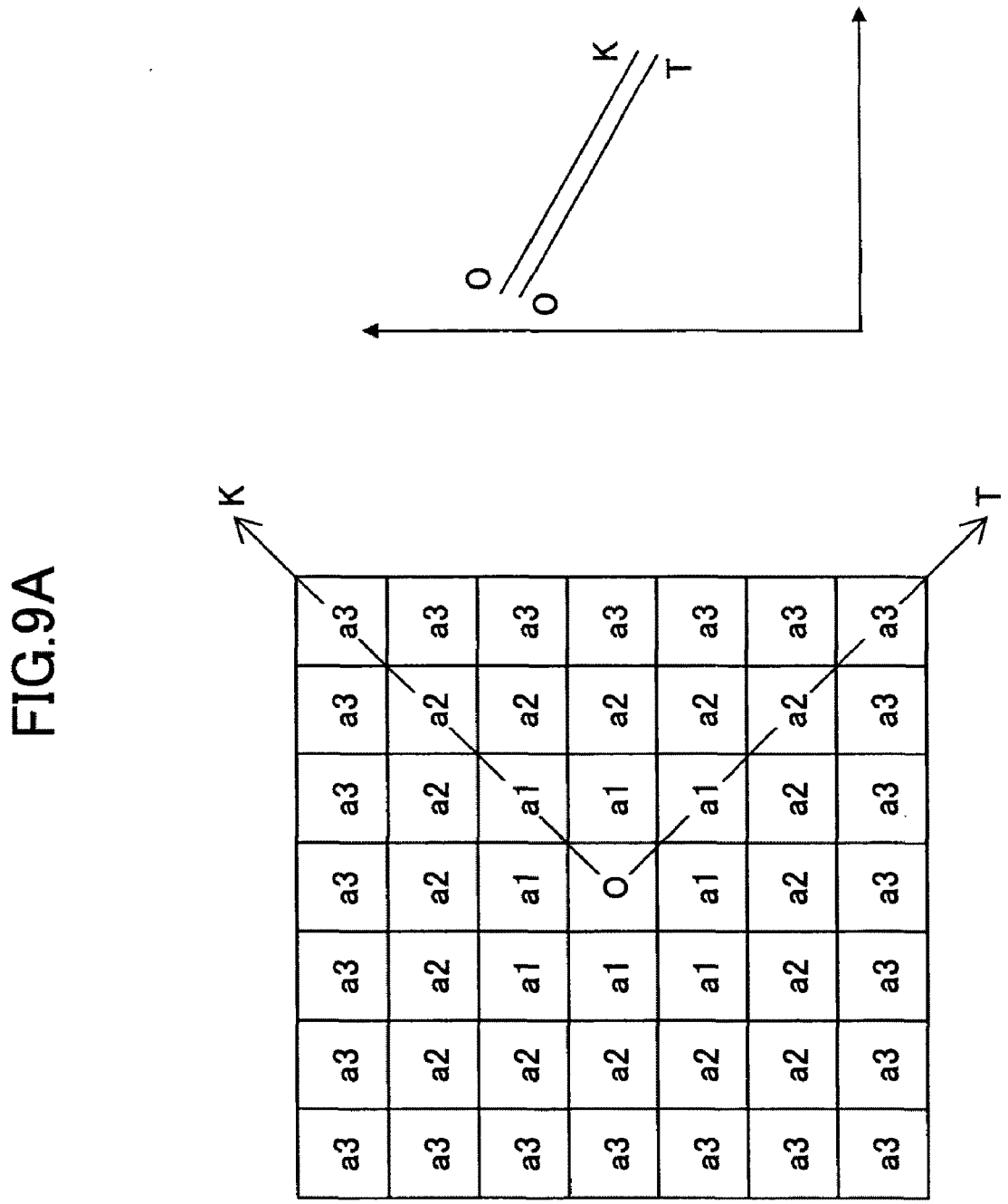
FIG. 9A is an example of a diagram schematically showing a Gaussian filter in which an edge direction θ is not considered.

FIG. 9A is a diagram schematically showing the Gaussian filter in which the edge direction θ is not considered, and FIG. 9B is a diagram schematically showing the Gaussian filter weighted in the edge direction θ. In FIG. 9A, "O" is the notice pixel, and the relationship O>a1>a2>a3 among the components of the Gaussian filter is established. In FIG. 9B, D is the notice pixel, and the relationships D>E>F>G, D>C>B>A, D>P>Q>R, and D>O>N>M are established. In other words, A through G and M through R become smaller as they are far from the notice pixel D.

Accordingly, it is clear from the above that the Gaussian filter shown in FIG. 9A isotropically performs the smoothening processing with the notice pixel as a center. On the other hand, the Gaussian filter shown in FIG. 9B has anisotropy in the directions of A through G and/or M through R. Let it be assumed that the direction of A through G is the direction parallel to the edges, and the direction of M through R is the direction orthogonal to the edges. In this case, as shown in the right diagram of FIG. 9B, the components of D, E, F, and G show a small change with respect to a distance from the notice pixel D (strong smoothening), and the components of D, P, Q, and R show a large change with respect to the distance from the notice pixel D (weak smoothening).

The smoothening part 54 smoothens the notice pixel for each maximum neighboring region with the Gaussian filter determined based on the formula (4), thereby making it possible to strongly perform the smoothening processing in the direction parallel to the edges and weakly perform the smoothening processing in the direction normal to the edges.

Fourth Embodiment

In the first through third embodiments, the smoothening processing is applied to the rectangular and circular maximum neighboring regions. This embodiment refers to the image processing unit 100 that applies the smoothening processing to an elliptical maximum neighboring region. Forming the maximum neighboring region into an elliptical shape makes it possible to appropriately apply the smoothening processing for each axial direction of an ellipse.

Note that similar to the first embodiment, this embodiment uses the functional block diagram of the noise reduction processing part 44 shown in FIG. 4 and the flowchart shown in FIG. 5. This embodiment is characterized by the smoothening processing in steps S104 and S105 in the flowchart.

(S104)

In step S104 in this embodiment, the maximum neighboring region calculation part 53 calculates the elliptical maximum neighboring region. Here, the long axis of the ellipse, which is parallel to the edge direction θ, is determined. FIG. 10A is an example of a diagram schematically showing the maximum neighboring region of the ellipse whose long axis is made parallel to the edge direction θ. Since the normal direction of the edges is calculated based on arctan(fy/fx), the direction orthogonal to the normal direction is the edge direction θ.

The maximum neighboring region calculation part 53 first finds the edge direction θ of the notice pixel. Then, the maximum neighboring region calculation part 53 sets an A-axis orthogonal to the edge direction θ and a B-axis orthogonal to the A-axis. In other words, the A-axis represents the direction of the short axis, and the B-axis represents the direction of the long axis. The maximum neighboring region calculation part 53 determines the neighboring region along the A-axis and the B-axis.

Specifically, the maximum neighboring region calculation part 53 starts with n=1 with the notice pixel as a center to set the neighboring region and determines whether the sum of the edge intensities of the neighboring region exceeds a threshold. If it is determined that the sum of the edge intensities of the neighboring region does not exceed the threshold, n is increased by two (i.e., n=3) and a determination is made as to "whether the sum exceeds the edge intensities E of a predetermined value or higher in the direction of the short axis."

If it is determined that the sum of the edge intensities of the neighboring region does not exceed the threshold, the maximum neighboring region calculation part 53 increases the number of the pixels by two in the direction of the short axis and increases the number of the pixels by, for example, two or more in the direction of the long axis to set the neighboring region. The reason why the number of the pixels is increased by two or more is to set the elliptical neighboring region. Here, the long axis is extended in accordance with, for example, preset ellipticity. For example, the short axis is increased by two, while the long axis is increased by about two through four.

In the direction not orthogonal to the long axis or the short axis, a profile is determined based on an elliptical formula ($l^2/a^2 + m^2/b^2 = 1$) in accordance with the ellipticity, and the pixels contained in the profile are set to the neighboring region. Note that instead of a complete ellipse, a diamond-shaped region obtained by connecting the ends of the long axis and the short axis to each other may be used as the neighboring region. The maximum neighboring region calculation part 53 determines the neighboring region in this manner and determines whether the sum of the edge intensities E exceeds a threshold.

"If the sum exceeds the edge intensities E of a predetermined value or higher in the direction of the short axis in the process of determining the neighboring region," the maximum neighboring region calculation part 53 no longer increases n in the direction of the short axis but increases n only in the direction of the long axis. Accordingly, as shown in FIG. 10B, it is possible to set the elliptical neighboring region having the long axis in the edge direction θ with the length between the edges limited to the length of the short axis.

When the maximum neighboring region where the sum of the edge intensities E exceeds a threshold is determined through the repetition of the above processing, the smoothening part 54 generates the Gaussian filter by using the three elements of the length a of the long axis, the length b of the short axis, and the axis direction θ. Thus, the smoothening processing is strongly applied in the direction of the long axis of the elliptical maximum neighboring region so that noise can be easily reduced. Furthermore, the smoothening processing is weakly applied in the direction of the short axis of the elliptical maximum neighboring region so that the edges can be preserved.

(S105)

In step S105, the smoothening part 54 applies the smoothening processing to the elliptical maximum neighboring region of the image data of the document 41.

In order to strongly apply the smoothening processing in the direction of the long axis of the ellipse, it is only required that the components of the Gaussian filter be weighted in accordance with the axis direction θ similar to the third embodiment. The following formula (5) is an example of a formula for setting the Gaussian filter weighted in accordance with the edge direction θ.

Accordingly, it is possible to set the Gaussian filter that has the components dispersed at maximum in the direction parallel to the direction of the long axis (the edge direction) and the components dispersed at minimum in the direction of the short axis (the direction orthogonal to the edge direction).

$$G(p, q) = \frac{1}{Z}\exp\left\{-\frac{1}{2}\left(R_\theta\binom{p}{q}\right)^T \binom{a^2\ 0}{0\ b^2}^{-1} \left(R_\theta\binom{p}{q}\right)\right\} \quad (5)$$

$$R_\theta = \begin{pmatrix} \cos\theta & -\sin\theta \\ \sin\theta & \cos\theta \end{pmatrix}$$

Note that the direction of the long axis of the ellipse is defined as Z, the normalized constant thereof is defined as Z, and the positive constant thereof is defined as c. Similar to the above-described formula (5), (p,q) is the coordinate position of the pixel next to the notice pixel. Considering that Rθ is a rotating matrix, it is possible to change the degree of the smoothening processing with the notice pixel as a center in accordance with the edge direction. Accordingly, if a difference between a and b is large, a large weight is assigned in the θ direction. On the other hand, if the difference between a and b is not so large, the components of the Gaussian filter are the same irrespective of the direction. As a result, the smoothening processing can be isotropically realized. Specifically, the smoothening processing can be strongly applied in the direction where the density of edges is low, while the smoothening processing can be weakly applied in the direction where the density of the edges is high. Furthermore, with a term of "$a^2$, $b^2$," the smoothening processing can be strongly applied as the area of the ellipse is larger.

Fifth Embodiment

In step S104 in the fourth embodiment, the directions of the long axis and the short axis of the elliptical region are determined based on the direction of the edge of the notice pixel. This embodiment refers to the image processing unit 100 that determines the shape of an ellipse based on the distribution of edge intensities. Thus, it is possible to set the direction where the distribution of edges is thin as the long axis of the ellipse and strongly apply the smoothening processing in the direction where the density of the edges is low.

Figure 11A:
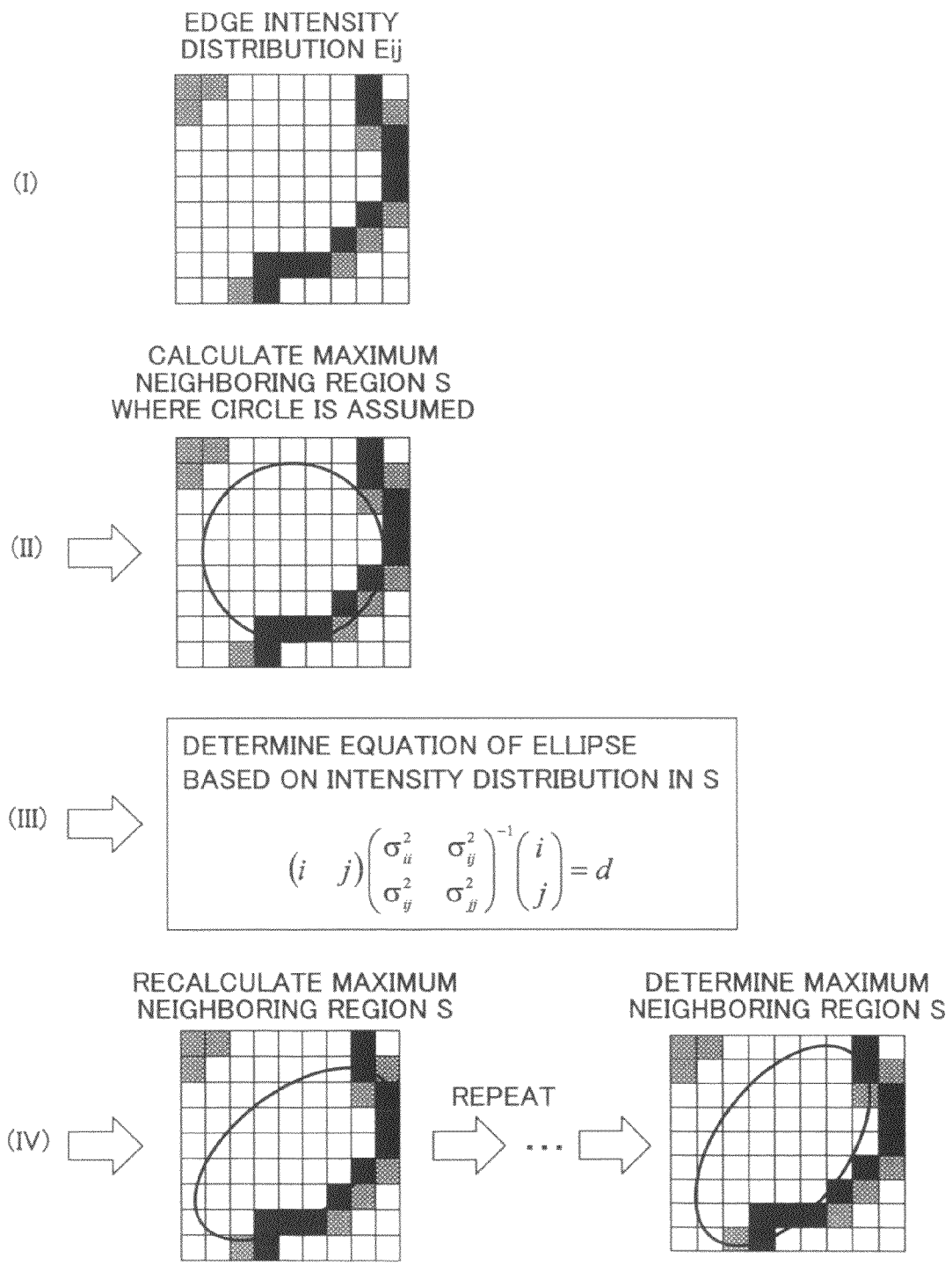
FIG. 11A is an example of a diagram schematically showing a procedure in which a maximum neighboring region calculation part determines the shape of an ellipse based on the distribution of edge intensities.

FIG. 11A is an example of a diagram schematically showing a procedure in which the maximum neighboring region calculation part 53 determines the shape of the ellipse based on the distribution of the edge intensities. In FIG. 11A, each cell represents one pixel. The hatch pixels indicate that the edges have been detected. The darker hatch pixels represent greater edge intensities E.

(I) First, the maximum neighboring region calculation part 53 assumes a circular neighboring region with respect to image data in which the edges are distributed as shown in FIG. 11A. Thus, the circular neighboring region is obtained.

(II) Then, similar to the first embodiment, the maximum neighboring region calculation part 53 determines the maximum neighboring region where the sum of the edge intensities of the circular neighboring region becomes greater than or equal to a threshold. In other words, the maximum neighboring region calculation part 53 gradually increases the size of the assumed circle until the sum of the edge intensities of the circular neighboring region becomes greater than or equal to the threshold.

(III) Next, the maximum neighboring region calculation part 53 determines an elliptical equation based on the distribution of the edge intensities of the maximum neighboring region. In FIG. 11A, the coordinate position of each pixel in the rectangular region is represented as (i,j), and the edge intensity of each coordinate position is represented as Eij. Note that the position of the notice pixel is set to (0,0) as the coordinates (i,j). Furthermore, the maximum edge intensity of the maximum neighboring region is represented as Emax. Then, the non-edge weight αij of each pixel is defined by the following formula.

$$\alpha_{ij} = \frac{E_{max} - E_{ij}}{\sum_{i,j \in S}(E_{max} - E_{ij})} \quad (6)$$

The denominator of the formula (6) is the sum of a difference between the maximum edge intensity Emax and the edge intensity Eij of all the pixels, and the numerator is the difference between the maximum edge intensity Emax and the edge intensity Eij of each pixel. Therefore, the non-edge weight αij can be regarded as the index of a small pixel value change at the coordinates (i,j). In other words, since the denominator becomes small as the pixel value change in the maximum neighboring region is smaller, the non-edge weight αij is likely to have a greater value.

Then, the maximum neighboring region calculation part 53 calculates the following three values in the maximum neighboring region (not in the rectangular region) by using the non-edge weight αij.

$$\sigma_{ii}^2 = \sum_{i,j \in S} \alpha_{ij} i^2 - \left(\sum_{i,j \in S} \alpha_{ij} i\right)^2 \quad (7)$$

$$\sigma_{ij}^2 = \sum_{i,j \in S} \alpha_{ij} ij - \left(\sum_{i,j \in S} \alpha_{ij} i\right)\left(\sum_{i,j \in S} \alpha_{ij} j\right) \quad (8)$$

$$\sigma_{jj}^2 = \sum_{i,j \in S} \alpha_{ij} j^2 - \left(\sum_{i,j \in S} \alpha_{ij} j\right)^2 \quad (9)$$

$\sigma^2_{ij}$ in the formulae (7) through (9) is a variance/covariance at the position of non-edges weighted by the non-edge weight αij. The formula (7) is the variance/covariance at the position of the non-edges between pixels in the vertical direction and represents the distribution of the non-edges in the vertical direction. The formula (8) is the variance/covariance at the position of the non-edges between the pixels in the horizontal direction and the vertical direction and represents the distribution of the non-edges in the oblique direction. The formula (9) is the variance/covariance at the position of the non-edges between the pixels in the horizontal direction and represents the distribution of the non-edges in the horizontal direction. Accordingly, the three variances/covariances represent the distribution of the non-edges in the maximum neighboring region.

The maximum neighboring region calculation part 53 sets the following elliptical equation by using these values.

$$\begin{pmatrix} i & j \end{pmatrix} \begin{pmatrix} \sigma_{ii}^2 & \sigma_{ij}^2 \\ \sigma_{ij}^2 & \sigma_{jj}^2 \end{pmatrix}^{-1} \begin{pmatrix} i \\ j \end{pmatrix} = d \quad (10)$$

In the formula (10), d is a parameter for determining the size of the ellipse. Thus, the ellipse is obtained from the assumed circle.

The maximum neighboring region calculation part 53 gradually increases the value of d from zero, and sets the ellipse determined based on d when the sum of the edge intensities Eij of the ellipse becomes greater than or equal to a threshold as the maximum neighboring region.

(IV) The maximum neighboring region calculation part 53 repeatedly applies the procedure of (III) to the elliptical maximum neighboring region. This is because the maximum neighboring region is changed in the process in which the assumed circular maximum neighboring region is converted into the elliptical one, and the variances/covariances at the position of the non-edges weighted by the non-edge weight αij are changed. In other words, the maximum neighboring region calculation part 53 calculates the non-edge weight αij of the elliptical maximum neighboring region from the formula (6) again and calculates the variances/covariances at the position of the non-edges from the formulae (7) through (9) again. Thus, a new elliptical equation is determined from the formula (10). The maximum neighboring region calculation part 53 gradually increases the value of d from zero, and sets the ellipse determined based on d when the sum of the edge intensities in the ellipse becomes greater than or equal to a threshold as the maximum neighboring region.

Since the elliptical equation is changed in the process in which the second elliptical maximum neighboring region is obtained from the first elliptical maximum neighboring region, the maximum neighboring region is changed. Therefore, the variances/covariances at the position of the non-edges are necessarily changed. Accordingly, the maximum neighboring region calculation part 53 repeats the procedure of (III) plural times.

The number of times that the maximum neighboring region calculation part 53 repeats the processing of (III) may be based on a maximum number. Alternatively, when the change amount of the maximum neighboring region becomes small enough, the processing of (III) may be completed. As described above, the maximum neighboring region calculation part 53 can finally determine the maximum neighboring region.

(S105)

Figure 11B:
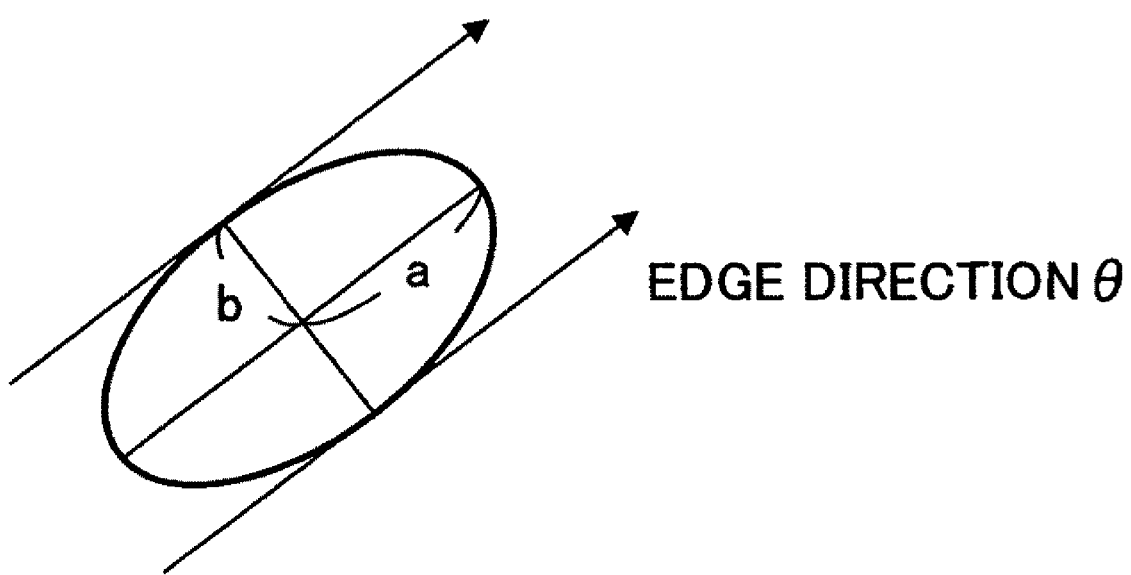
FIG. 11B is a diagram showing the maximum neighboring region of which the length a of a long axis, the length b of a short axis, and an axis direction θ are determined by a smoothening part.

When the maximum neighboring region is determined, the smoothening part 54 can apply the smoothening processing to the notice pixel as in the fourth embodiment. In other words, as shown in FIG. 11B, the smoothening part 54 determines the length a of the long axis, the length b of the short axis, and the axis direction θ from the maximum neighboring region. Then, the smoothening part 54 generates the Gaussian filter based on the formula (5).

Thus, the image processing unit 100 according to this embodiment can set the direction where the distribution of the edges is thin as the long axis of the ellipse and strongly perform the smoothening processing in the direction where the density of the edges is low.

Note that although the circular neighboring region is first assumed in this embodiment, it is also possible to set a 9×9 rectangular region with the notice pixel as a center as the neighboring region to calculate the elliptical equation in the same manner.

Furthermore, according to the method of this embodiment, since it is necessary to determine secondary statistics amounts (namely, the formulae (7) through (9)) in finding the elliptical equation, the calculation workload is high. Therefore, as a method for determining the equation more quickly, it is also possible to calculate an average position of the positions of the edges weighted by the edge intensity and set the direction from the notice pixel to the average position as the short axis of the ellipse and the direction orthogonal to the short axis as the long axis of the ellipse.

The following formula (11) is an example of a formula for determining the average position of the positions of the edges weighted by the weight of the edge intensity. The average position $(i_{av}, j_{av})$ of the positions of the edges weighted by the edge intensity is the coordinates of the pixel indicated by an average vector $G_{av}$. Here, the vector from the notice pixel to each other pixel is represented as $G_{ij}$.

$$G_{av} = \frac{\sum_{i,j \in S} E_{ij} \times G_{ij}}{\sum E_{ij}} \quad (11)$$

Meanwhile, a method for determining the maximum neighboring region using the distribution of the edge intensities according to this embodiment has a disadvantage in that the edges become blurred (the edges are also smoothened) if the notice pixel is positioned on the edge. Therefore, it is preferable that the maximum neighboring region calculation part 53 determine whether the notice pixel is positioned on the edge based on the edge intensity E of the notice pixel and change the method for determining the maximum neighboring region according to a determination result. In other words, if it is determined that the notice pixel is positioned on the edge, the maximum neighboring region calculation part 53 calculates the maximum neighboring region by the method using the edge direction of the notice pixel according to the fourth embodiment. On the other hand, if it is determined that the notice pixel is not positioned on the edge, the maximum neighboring region calculation part 53 calculates the maximum neighboring region by the method according to this embodiment. Thus, it is possible to set the direction where the distribution of the edges is thin as the long axis of the ellipse and strongly perform the smoothening processing in the direction where the density of the edges is low without making the edges become blurred.

As described above, the image processing unit 100 according to this embodiment applies the noise reduction processing depending on the size of the maximum neighboring region, thereby making it possible to perform noise processing based on the peripheral edge structure. Furthermore, since the present invention uses information on the edge intensities instead of information on the presence or absence of the edges, a robust result can be obtained with respect to noise. Furthermore, since the smoothening processing is strongly applied in the direction parallel to the edge direction and weakly applied in the direction orthogonal to the edge direction, the noise reduction processing can be performed while maintaining the edge structure.

The present invention is not limited to the specifically disclosed embodiments, and variations and modifications may be made without departing from the scope of the present invention.

The present application is based on Japanese Priority Applications No. 2008-195385 filed on Jul. 29, 2008, and No 2009-018377 filed on Jan. 29, 2009, the entire contents of which are hereby incorporated herein by reference.

What is claimed is:

1. An image processing unit stored in non-transitory computer readable medium that smoothens a notice pixel of input image data with pixel values of pixels around the notice pixel to reduce noise in the image data, the image processing unit comprising:
    an edge extraction unit that extracts an edge based on the pixel values of the image data;
    a region determination unit that determines a region to be processed where a sum of edge intensities of the pixels including the notice pixel becomes greater than or equal to a threshold; and
    a smoothening unit that changes a smoothening intensity in accordance with a size of the region to be processed to smoothen the notice pixel corresponding to the region to be processed, wherein
        the smoothening unit smoothens the notice pixel with a Gaussian filter that uses a value proportional to an area of the region to be processed as a variance parameter, and
        based on an edge direction of the extracted edge, the smoothening unit smoothens the notice pixel with the Gaussian filter in which a maximum variance component is set in a direction parallel to the edge direction and a minimum variance component is set in a direction orthogonal to the edge direction.

2. The image processing unit stored in non-transitory computer readable medium according to claim 1, wherein,
    based on an edge direction of the extracted edge, the smoothening unit makes the smoothening intensity in a direction parallel to the edge direction greater than the smoothening intensity in a direction orthogonal to the edge direction.

3. The image processing unit stored in non-transitory computer readable medium according to claim 1, wherein
    the edge extraction unit corrects the edge intensity of the edge whose intensity is less than or equal to a predetermined value to zero.

4. The image processing unit stored in non-transitory computer readable medium according to claim 1, wherein
    a neighboring region is formed into a circle or a rectangle with the notice pixel as a center.

5. An image processing unit stored in non-transitory computer readable medium that smoothens a notice pixel of input image data with pixel values of pixels around the notice pixel to reduce noise in the image data, the image processing unit comprising:
    an edge extraction unit that extracts an edge based on the pixel values of the image data;
    a region determination unit that determines a region to be processed where a sum of edge intensities of the pixels including the notice pixel becomes greater than or equal to a threshold, wherein
        the region determination unit further determines the region to be processed of an elliptical shape having a long axis in a direction where a distribution of the edges in the region to be processed is thin and a short axis in a direction orthogonal to the long axis,
        the region determination unit further determines, as the region to be processed, the elliptical shape that is represented by a quadratic form of an inverse matrix of a variance/covariance matrix at a position of a non-edge pixel having a low edge intensity; and a smoothening unit that changes a smoothening intensity in accordance with a size of the region to be processed to smoothen the notice pixel corresponding to the region to be processed, wherein
  the smoothening unit smoothens the notice pixel with a Gaussian filter that uses a value proportional to an area of the region to be processed as a variance parameter, and
  the smoothening unit changes the smoothening intensity in accordance with a length of the long axis and a length of the short axis to smoothen the notice pixel.

6. The image processing unit according to claim 5, wherein,
  based on an edge direction of the extracted edge, the smoothening unit makes the smoothening intensity in a direction parallel to the edge direction greater than the smoothening intensity in a direction orthogonal to the edge direction.

7. The image processing unit stored in non-transitory computer readable medium according to claim 5, wherein
  the edge extraction unit corrects the edge intensity of the edge whose intensity is less than or equal to a predetermined value to zero.

8. The image processing unit stored in non-transitory computer readable medium according to claim 5, wherein
  a neighboring region is formed into a circle or a rectangle with the notice pixel as a center.

9. An image processing unit stored in non-transitory computer readable medium that smoothens a notice pixel of input image data with pixel values of pixels around the notice pixel to reduce noise in the image data, the image processing unit comprising:
  an edge extraction unit that extracts an edge based on the pixel values of the image data;
  a region determination unit that determines a region to be processed where a sum of edge intensities of the pixels including the notice pixel becomes greater than or equal to a threshold, wherein
    the region determination unit further determines the region to be processed of an elliptical shape having a long axis in a direction where a distribution of the edges in the region to be processed is thin and a short axis in a direction orthogonal to the long axis,
    the region determination unit further determines whether the notice pixel has the edge whose intensity is greater than or equal to a predetermined value,
    the region determination unit further determines the region to be processed of the elliptical shape having the long axis parallel to an edge direction and the short axis orthogonal to the edge direction if the notice pixel has the edge whose intensity is greater than or equal to the predetermined value, and
    the region determination unit further determines the region to be processed of the elliptical shape having the long axis in the direction where the distribution of the edges in the region to be processed is thin and the short axis in the direction orthogonal to the long axis if the notice pixel does not have the edge whose intensity is greater than or equal to the predetermined value; and
  a smoothening unit that changes a smoothening intensity in accordance with a size of the region to be processed to smoothen the notice pixel corresponding to the region to be processed, wherein
    the smoothening unit smoothens the notice pixel with a Gaussian filter that uses a value proportional to an area of the region to be processed as a variance parameter, and
    the smoothening unit changes the smoothening intensity in accordance with a length of the long axis and a length of the short axis to smoothen the notice pixel.

10. The image processing unit stored in non-transitory computer readable medium according to claim 9, wherein,
  based on an edge direction of the extracted edge, the smoothening unit makes the smoothening intensity in a direction parallel to the edge direction greater than the smoothening intensity in a direction orthogonal to the edge direction.

11. The image processing unit stored in non-transitory computer readable medium according to claim 9, wherein
  the edge extraction unit corrects the edge intensity of the edge whose intensity is less than or equal to a predetermined value to zero.

12. The image processing unit stored in non-transitory computer readable medium according to claim 9, wherein
  a neighboring region is formed into a circle or a rectangle with the notice pixel as a center.

* * * * *